March 3, 1970  J. G. SUNDBERG  3,498,231

GEAR PUMP WITH UNITIZED SEALING ELEMENTS

Filed April 26, 1968  2 Sheets-Sheet 1

INVENTOR
JACK G. SUNDBERG
BY Radford W Luther
ATTORNEY

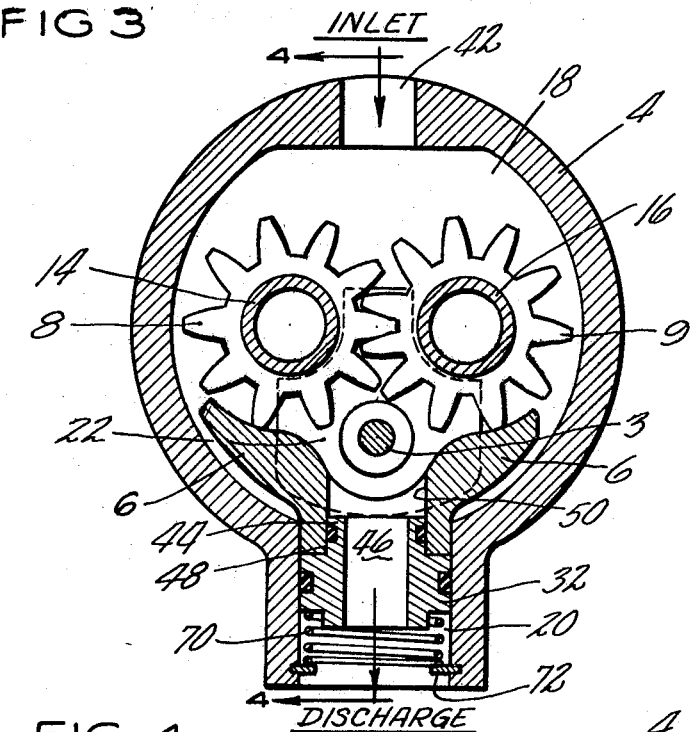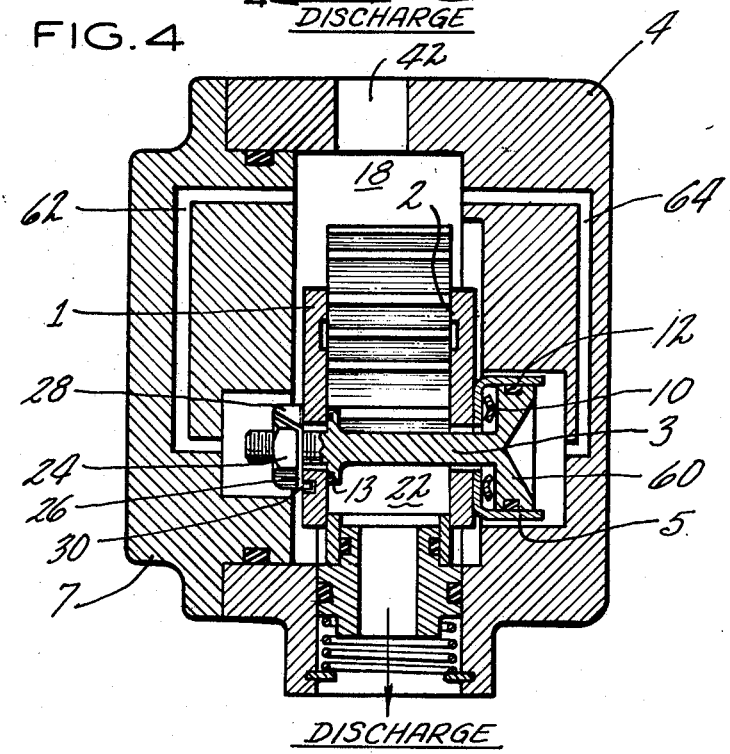

United States Patent Office 3,498,231
Patented Mar. 3, 1970

3,498,231
GEAR PUMP WITH UNITIZED
SEALING ELEMENTS
Jack G. Sundberg, Meriden, Conn., assignor to Chandler Evans Inc., West Hartford, Conn., a corporation of Delaware
Filed Apr. 26, 1968, Ser. No. 724,535
Int. Cl. F04c 5/00, 17/10, 27/00
U.S. Cl. 103—126     4 Claims

ABSTRACT OF THE DISCLOSURE

A gear pump incorporating a movable sealing element disposed between movable sideplates and having a through bolt with an enlarged section on one end, including a spring intermediate said enlarged section and one sideplate, said bolt positioned through both sideplates and adjacent said movable sealing element to thereby tie together the sideplates, gears and floatable sealing element as a unitized structure with an accurately controlled preload and operating force combining to control the sealing engagement of the mating sealing surfaces of the elements of said unitized structure.

BACKGROUND OF THE INVENTION

This invention relates to force orientating apparatus for reducing the machining and structural requirements necessary to generate the forces that establish sealing engagement between the mating surfaces of the sideplates, gears and movable sealing elements in a gear pump incorporating a sealing element floatably disposed in the pump outlet chamber. More particularly, this invention relates to means constructed and arranged to tie together the sideplates, gears and sealing blocks as a unitized structure wherein the preload forces between the mating sealing surfaces of said unitized structure are accurately controlled.

In a gear pump having a block known as a "sealing block" or having a functionally equivalent plurality of blocks floatably disposed in the pump outlet chamber in sealing engagement with the tips of the gear teeth, cross port leakage from the outlet chamber to the inlet chamber across the end faces of the gears or across the sealing blocks is limited by providing sideplates biased toward the gear and sealing block end faces to form an outlet chamber bounded respectively by gear teeth, the sealing blocks and the sideplates. The design of sideplates having trapped volume relief grooves positioned opposite the mesh point of a gear pair and having suitable overlap dimensions established to provide sealing engagement between the sideplates and gear and sealing block end surfaces is well known in the art. Effective sealing engagement cannot be obtained unless the sideplate inboard surface and the surfaces of the gears and sealing blocks cooperating therewith are essentially flat and smooth. At least one such sideplate is required and a pair is desirable if it is not convenient to produce the desired material and surface conditions at a pump housing end plate inboard surface adjacent one end of the gears and sealing block. Another obstacle to effective sealing arises when each gear end face does not form a common plane with its respective sealing block end face.

Hithertofore the bias force urging a sideplate into sealing engagement with a gear face has been exerted by an elastomeric "O-ring" seal mechanically compressed between a sideplate outboard face and an internal face of the pump housing combined with a fluid force exerted within a sideplate loading chamber bounded by said "O-ring" seal and the respective cooperating sideplate and pump housing faces. Fluid communication between said sideplate loading chamber and high pressure pump outlet chamber has been provided by means of an aperture in the sideplates or by passageways within the pump housing. This arrangement provides an initial positive mechanical force during pump start-up under load which is supplemented by fluid pressure loading as discharge pressure increases.

It will be apparent that an efficient seal requires the centroid of the mechanical and fluid pressure sealing forces to substantially coincide with the centroid of the opposing lifting forces caused by fluid pressure within the pump discharge chamber and the gradient thereof acting across the overlapping sealing surfaces. The magnitude of any tipping moment acting to lift a sideplate is directly proportional to the misalignment of the opposing force resultants. The loading force centroid may be theoretically calculated but can be shifted by a variation in "O-ring" squeeze along its perimeter due to a number of conditions such as nonparallelism between the inboard face and outboard face of the seal plates, or non-square orientation of the gear support journal with respect to the plane of the pump housing face contacted by the "O-ring" seal. Accurate orientation of journal and seal areas in the pump housing is a relatively costly operation. Similarly, cutting and deburring "O-ring" seal grooves in sideplates or housings is a costly operation.

While the prior art "O-ring" seal arrangement functions, care in manufacturing and assembly is required which can be eliminated or reduced by the apparatus disclosed herein, and as a corollary, production costs may be reduced as a result of lower scrap rates in raw and machined pump housing castings, and "O-ring" seals damaged at assembly. Other improvements in manufacture and assembly will become apparent from the description of the improved apparatus disclosed herein.

In addition to the problems of alignment and finishing previously discussed, it is immediately apparent that the magnitude of the mechanical preload exerted upon the sideplates is subject to an undesirably large tolerance stackup which controls the compression of the "O-ring" seal. The preload force is dependent on the combined effect of "O-ring" cross-sectional diametral tolerance, internal pump housing tolerance across the discharge chamber area, gear and sealing block tolerances, sideplate thickness tolerance and the resiliency or "rate" tolerance of the "O-ring" seal material. Thus, to produce a reasonably predictable mechanical force by use of "O-ring" squeeze, the costly practice of selective shimming of the pump housing cover with respect to the housing body must be utilized to circumvent problems caused by dimensional tolerances of intervening components. Selective shimming is a troublesome procedure experienced at any teardown of a pump for routine inspection, including routine inspections that do not require disturbance of a unitized gear-sealing block-sideplate package.

SUMMARY OF INVENTION

The apparatus of the instant invention discloses a unitized configuration in which preload can easily be accurately established and the position of the centroid of the load, whether mechanical or fluid, acting to position the sideplates is accurately controlled and can be placed in vector opposition to the discharge chamber pressure vector. Additionally, the expensive pump housing quality control and machining operations can be eliminated. Further, shimming at each assembly and reassembly can also be eliminated by use of a unitized gear-sideplate-sealing block subassembly fastened by a tie bolt, said tie bolt being so constructed and arranged as to draw together the opposite sideplates to trap the gears and sealing blocks therebetween. A Belleville spring or wave washer interjacent the outboard side of one sideplate and the under-side of the tie bolt head applies an adjustable compressive force to the mating sealing surfaces of sideplates, gears and sealing block. Fluid pressure is introduced into a cylindrical chamber formed by the bore of a hollow cylindrical member permanently affixed to one sideplate, the face of the sideplate and the tie bolt head positioned in said bore. The bolt head is circumscribed by an "O-ring" seal and is sealingly axially movable disposed within the bore of the cylindrical member. The fluid pressure in said chamber forces the sideplate and bolt head apart thereby increasing tie bolt tension and bringing the sideplates into closer engagement with the gear and sealing block end surfaces. The bolt head area must be sufficient with respect to the corresponding pump discharge chamber cross-sectional area to provide, in combination with the spring force, a total force differential adequate to overcome the combined fluid force in the discharge chamber and the fluid force exerted at the seal plate-to-gear-to-sealing block overlap area subject to a reduced pressure gradient.

An object of this invention is to provide a unitized gear-sealing block-sideplate configuration in which preload can be accurately established and the position of the centroid of the load, both mechanical and fluid pressure generated, acting to position the sideplates, can be accurately controlled and placed in vector opposition to the force resultant generated by the discharge chamber fluid pressure.

Another object is to eliminate the expensive quality control and machining operations caused by the closed tolerances demanded of current gear pump sideplate preload devices.

Another object is to eliminate shimming at each assembly and reassembly through the use of a unitized gear-sideplate-sealing block subassembly fastened together by means of a tie bolt constructed and arranged to draw together the opposite sideplates and thereby trap the gears and sealing blocks therebetween.

Another object is to utilize a piston type tie bolt partially disposed in the pump discharge chamber to provide a force acting against the sideplates of a gear pump such that said sideplates are in leakage limiting engagement with the mating sealing surfaces of the gears and sealing block positioned therebetween.

Further objects will become apparent to one skilled in the art upon examination of the following disclosure and accompanying drawings.

DESCRIPTION OF THE DRAWINGS

The following is a brief description of the drawings accompanying the detailed description of the instant invention:

FIGURE 3 is a sectional view along line 3—3.
FIGURE 4 is a sectional view along line 4—4.

Referring to FIGURE 3, intermeshed gears 8 and 9 incorporating shafts 14 and 16 are rotatably supported in journal bearings 34, 36, 38 and 40 respectively in pump housing 4 and pump housing cover 7. Housing 4 and cover 7 form a pumping chamber 18 with an inlet 42 thereto. A sealing block 6 has thereon two arcuate segmented gear wiping surfaces having length, radii, and center distances chosen to permit simultaneous fluid sealing engagement with the peripheral surfaces of several teeth of each of rotating gears 8 and 9. A sealing block loading plunger 32 slidably sealingly axially movably disposed in a discharge passageway 20 within pump housing 4 is acted upon primarily by inlet pressure across its inboard face and by discharge pressure across its outboard face. A small diameter extension 44 of plunger 32 is sealingly disposed in a passageway 48 in sealing block 6, said extension having a passageway 46 therein connecting passageway 50 and discharge passageway 20 with pump discharge chamber 22. The wear block passageway 50 is in fluid communication with fluid discharge chamber 22 (shown in phantom) bounded by gears 8 and 9, sealing block 6, and sideplates 1 and 2. Each sideplate provides a sealing overlap with an end face 52, 54, 56 and 58 of each gear respectively and a portion of an end face of said sealing block, the minimum sealing block overlap distance along the gear-to-sealing block interface being measured from the nearest edge of discharge chamber 22 and being equal in length to the tooth tip pitch. If the unit bearing load on shafts 14 and 16 requires that they be of equal or larger diameter than the gear tooth root diameter, these shafts may be locally undercut adjacent to the end faces of the gears to accommodate and provide a sealing surface for engagement with sideplates 1 and 2 inboard of the gear tooth root diameter.

Referring to FIGURE 4, wherein gears 8 and 9 are compressed between sideplates 1 and 2 under the influence of the deformation of wave washer 10 producing a spring preload resulting in a tension in tie bolt 3 reacting against wave washer 10 through the head 60 of said tie bolt. A nut 24 is fixed with respect to sideplate 1 by washer 26 having permanently deformable tabs 28 and 30 which engage a flat on nut 24 and a slot on sideplate 1 respectively. A seal 13 abutting a shoulder on bolt 3 prevents leakage from occurring along the shank of tie bolt 3 from discharge chamber 22 and through sideplate 1 to a cavity containing nut 24, said cavity being in fluid communication via passageway 62 with the inlet portion of pumping chamber 18. A hollow cylindrical member such as a drawn cup may be brazed or otherwise suitably affixed to sideplate 2 to form a piston cup 5 containing the cylindrical head 60 of tie bolt 3 disposed in axially slidable relation thereto, the tie bolt head 60 having an "O-ring" seal 12 disposed in a peripheral groove thereon for sealing engagement with cup 5. The cavity outboard of the head of tie bolt 3 is referenced via passageway 64 to pump inlet pressure while that inboard of the bolt head is referenced to pump discharge pressure.

Figure 1:
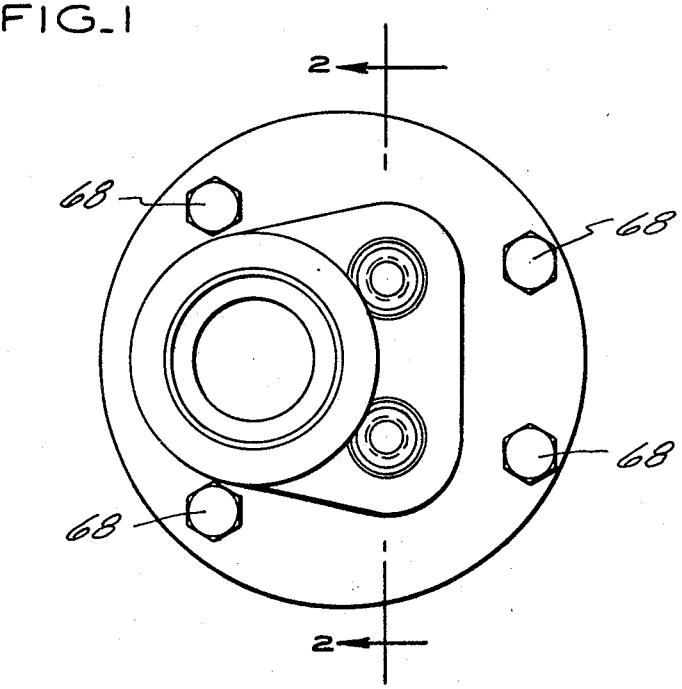
FIGURE 1 is a front view of the form of a pump incorporating the instant invention.
Figure 2:
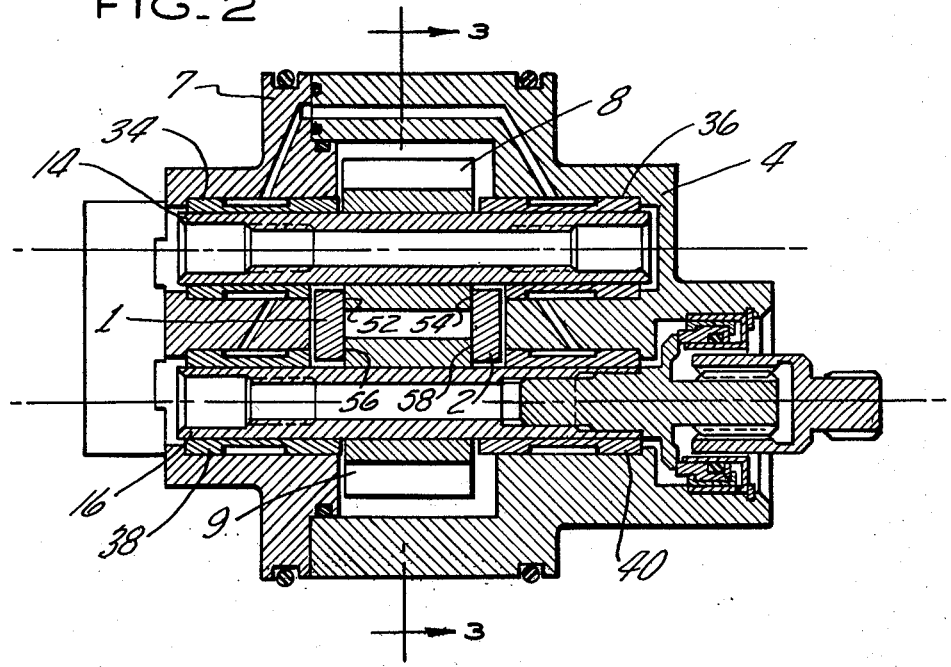
FIGURE 2 is a sectional view along line 2—2.

Gears 8 and 9, sealing block 6, sideplates 1 and 2, seals 12 and 13, tie bolt 3, wave washer 10, tab washer 26 and nut 24 are assembled as a contiguous unit to thereby provide a measurable deformation of wave washer 10 corresponding to a known force associated therewith. This unitized assembly is then inserted into pumping chamber 18 in housing 4 such that the gear supporting shafts 14 and 16 engage their respective journal bearings 34, 36, 38 and 40 disposed in housing 4. Pump housing cover 7 sealingly engages housing 4 such that journal bearings 34 and 38 therein engage shafts 14 and 16 to provide support thereto. Cover 7 is secured to housing 4 by means of suitable bolts 68. Plunger 32 is inserted in discharge passageway 20 and urged against sealing block 6 by means of a suitable spring 70 disposed outboard of plunger 32 and positioned intermediate plunger 32 and retaining ring 72 to cause the desired preload to urge block 6 into proper peripheral sealing engagement with gears 8 and 9. Thus, at low discharge pressure, the sideplates and sealing block are urged into sealing engagement under the influence of mechanical preload spring devices while at high discharge pressures, additional fluid forces are brought to bear to counter the fluid pressure forces acting to overcome the previously established sealing engagements.

While one embodiment of the present invention has been disclosed in detail, other embodiments and modifications of the invention are contemplated. Thus, it is the intention to include all embodiments and modifications of the invention defined by the appended claims within the scope of the invention.

What I claim as my invention is:
1. A gear pump comprising, a housing having parallel intersecting pump bores therein, a pair of intermeshing gears disposed in said pump bores and having gear shafts rotatably supported in said housing, a low pressure inlet and a high pressure outlet positioned at opposite sides of the mesh point of said gears, a plurality of sideplates, a movable gear tooth peripheral sealing element positioned intermediate said sideplates, additional means comprising a tie bolt including an enlarged section at one end, one of said sideplates having an elongated protuberance extending from one of the lateral faces thereof with a bore extending through said protuberance, said enlarged section of said tie bolt slideably disposed in said bore and slideably engaging a second sideplate to thereby generate a continuous force that is imposed on said sideplates to urge said sideplates into sealing engagement with the lateral faces of said gears and the lateral faces of said movable peripheral tooth sealing element to thereby fluidly sealingly separate said low pressure inlet and said high pressure outlet.

2. A gear pump, as defined in claim 1, including resilient means positioned intermediate the enlarged section of said tie bolt and the lateral face of said sideplate to thereby generate a yieldable adjustable preload force that is impressed on said sideplates to urge said sideplates into sealing engagement with the lateral faces of said gears and said movable peripheral tooth sealing element.

3. A gear pump comprising, a housing having parallel intersecting pump bores therein, a pair of intermeshing gears disposed in said pump bores and having gear shafts rotatably supported in said housing, a low pressure inlet and a high pressure outlet positioned at opposite sides of the mesh point of said gears, a plurality of sideplates, a movable gear tooth peripheral sealing element positioned intermediate said sideplates, additional means comprising a tie bolt having an enlarged cylindrical section at one end and an integral flange positioned adjacent the opposite end, a first sideplate adapted to abut said flange and fixedly secured to the flange end of said tie bolt, a second sideplate adapted to abut the shoulder of said enlarged cylindrical section at the other end of said tie bolt such that said tie bolt, said first and second sideplates, side movable peripheral sealing means and the lateral faces of said intermeshing gears form a contiguous unit.

4. A gear pump, as claimed in claim 3, wherein said second sideplate includes a protuberance having a cavity positioned therein, said enlarged cylindrical section received by said cavity to form a chamber in fluid communication with said high pressure outlet, spring means positioned intermediate said enlarged cylindrical section and said second sideplate such that a continuous preload force is impressed on said sideplates and said preload force is supplemented by the force generated by discharge pressure communicated to said chamber.

References Cited

UNITED STATES PATENTS

| 2,742,862 | 4/1956 | Banker. |
| 2,817,297 | 12/1957 | Mosbacher. |
| 2,996,999 | 8/1961 | Trautman. |
| 3,208,393 | 9/1965 | Kosch. |
| 3,427,985 | 2/1969 | Difford. |
| 3,429,270 | 2/1969 | Noell et al. |
| 3,437,048 | 4/1969 | Noell et al. |

DONLEY J. STOCKING, Primary Examiner

W. J. GOODLIN, Assistant Examiner

U.S. Cl. X.R.

103—216